Figure 1:
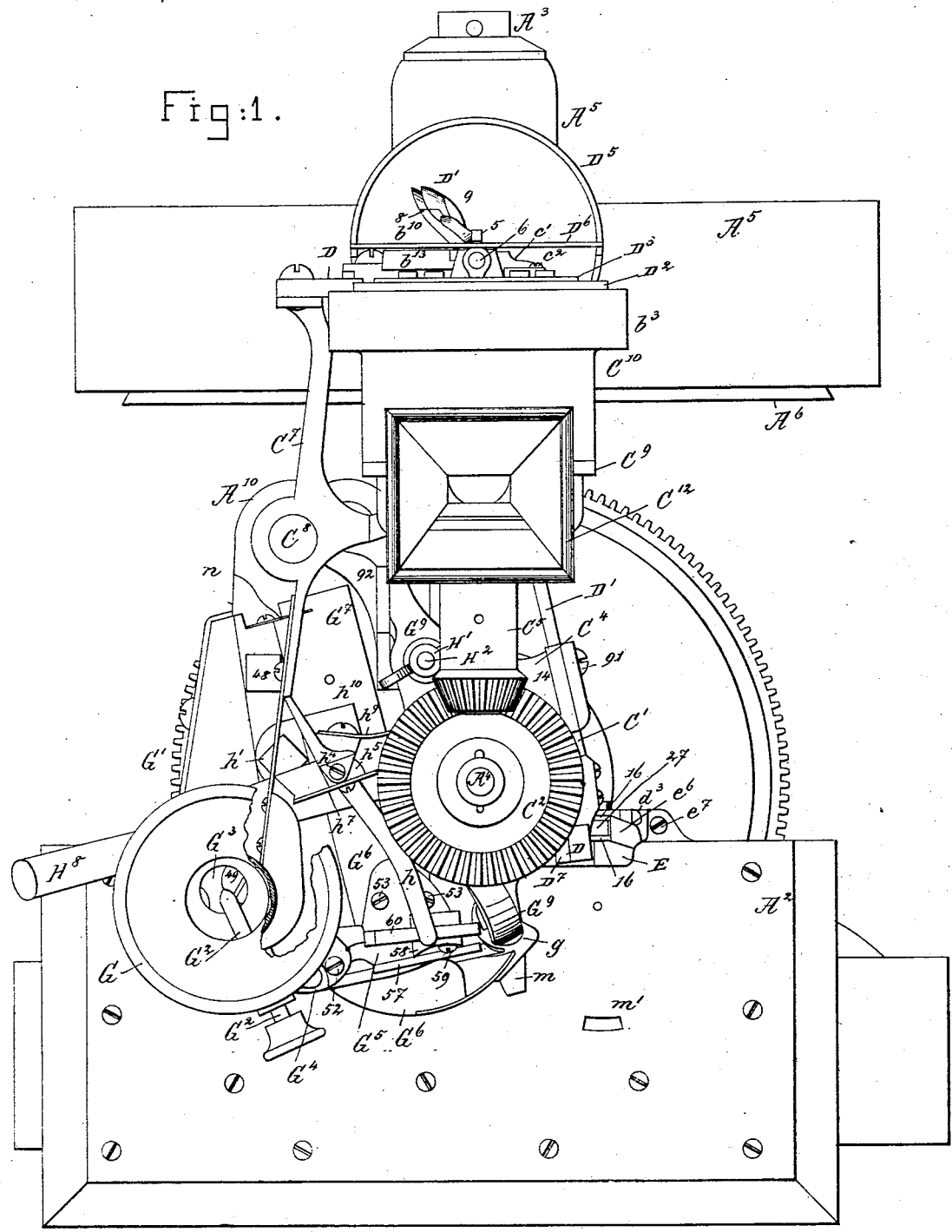

(No Model.) 9 Sheets—Sheet 1.

H. N. HEMINGWAY.
MACHINE FOR ATTACHING BUTTONS TO BOOTS, SHOES, OR OTHER ARTICLES.

No. 308,769. Patented Dec. 2, 1884.

Witnesses.
Arthur Tipperton.
A. O. Orne.

Inventor.
Henry N. Hemingway
by Crosby Gregory
Attys.

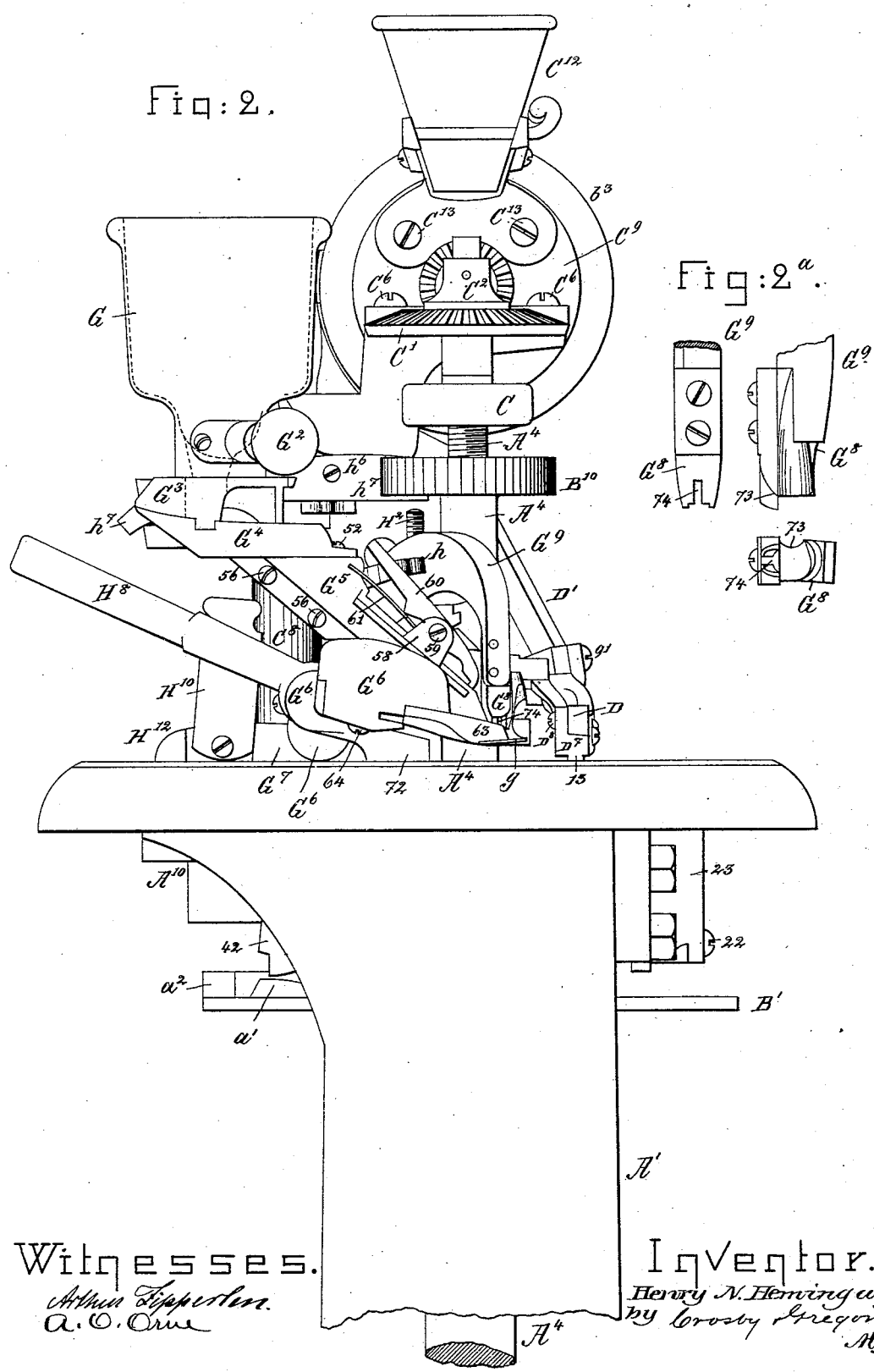

(No Model.)
9 Sheets—Sheet 3.
H. N. HEMINGWAY.
MACHINE FOR ATTACHING BUTTONS TO BOOTS, SHOES, OR OTHER ARTICLES.
No. 308,769.  Patented Dec. 2, 1884.
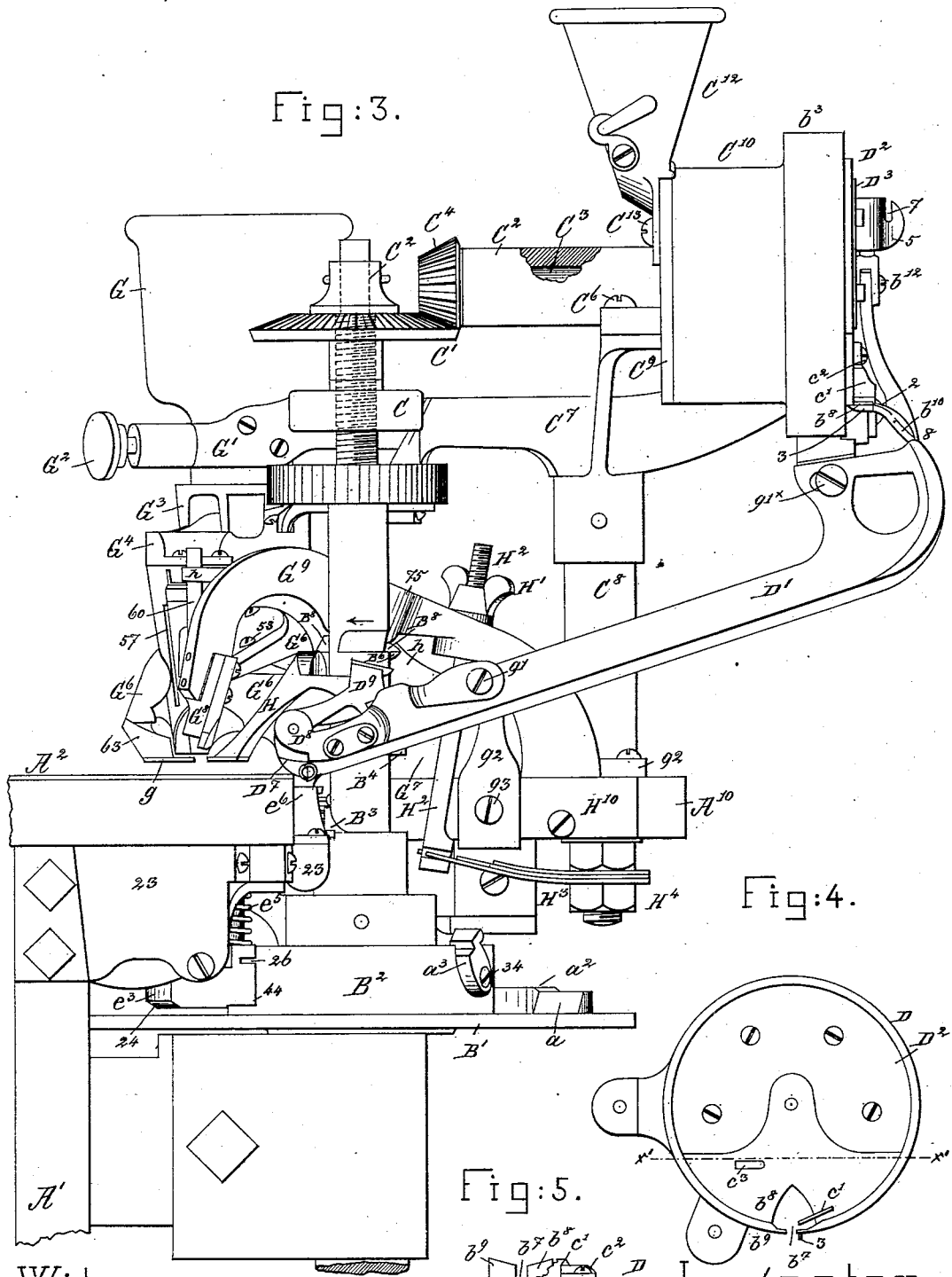
Witnesses.  Inventor.
Henry N. Hemingway.
By Crosby Gregory
Attys.

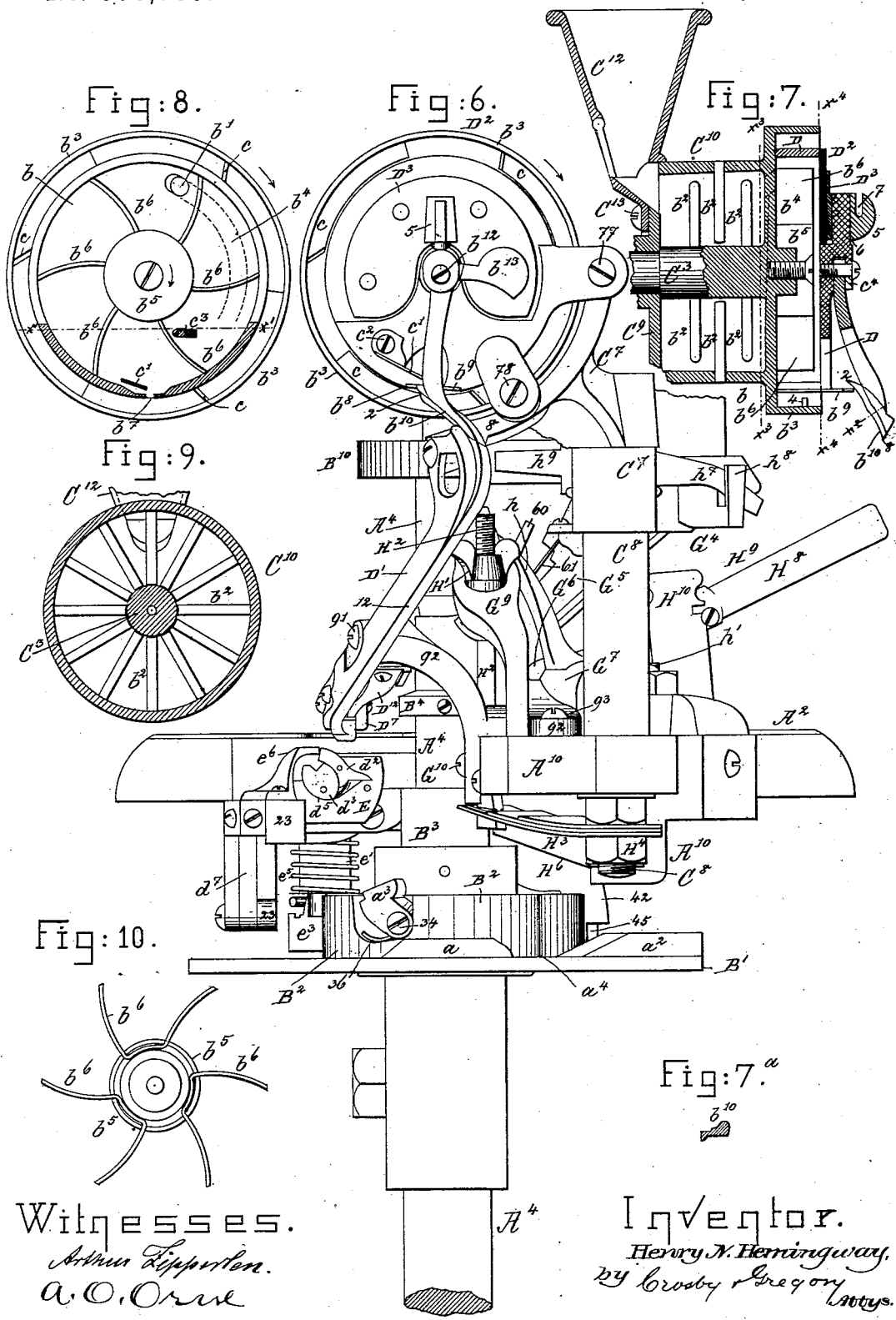

(No Model.)  9 Sheets—Sheet 5.
H. N. HEMINGWAY.
MACHINE FOR ATTACHING BUTTONS TO BOOTS, SHOES, OR OTHER ARTICLES.
No. 308,769.  Patented Dec. 2, 1884.
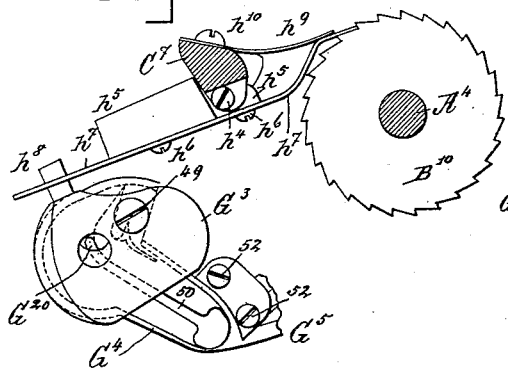
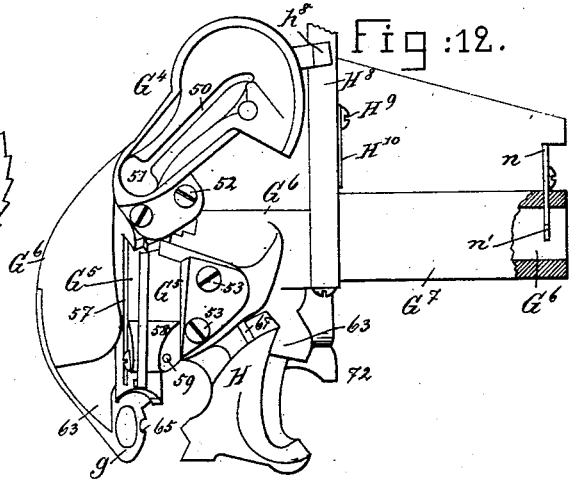
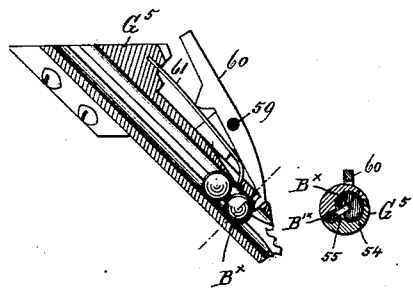
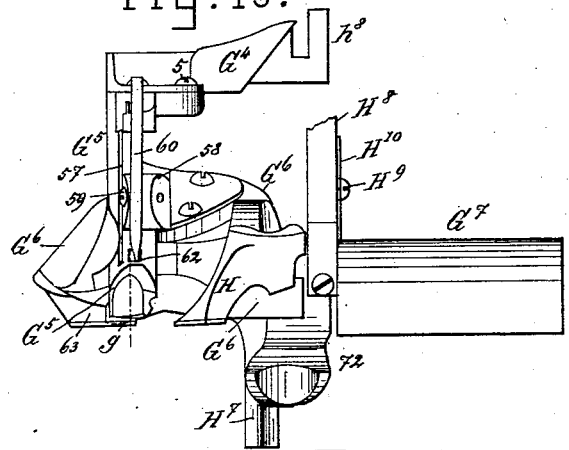
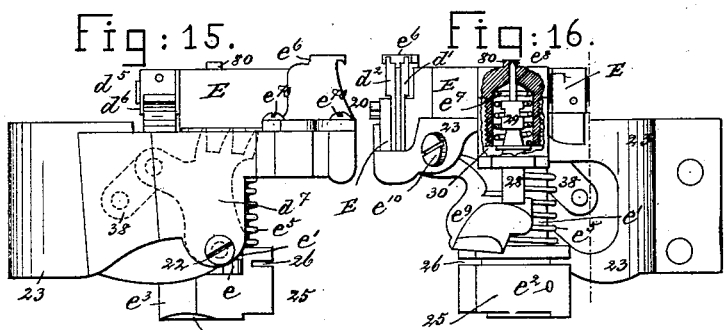
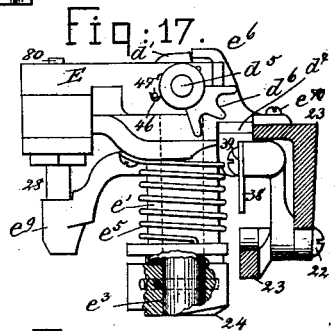
Witnesses.
Arthur Tipperton.
A. O. Orne.
Inventor.
Henry N. Hemingway.
by Crosby & Gregory
Attys.

(No Model.)  
9 Sheets—Sheet 6.
H. N. HEMINGWAY.
MACHINE FOR ATTACHING BUTTONS TO BOOTS, SHOES, OR OTHER ARTICLES.
No. 308,769. Patented Dec. 2, 1884.
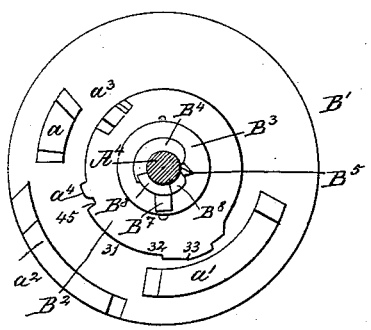
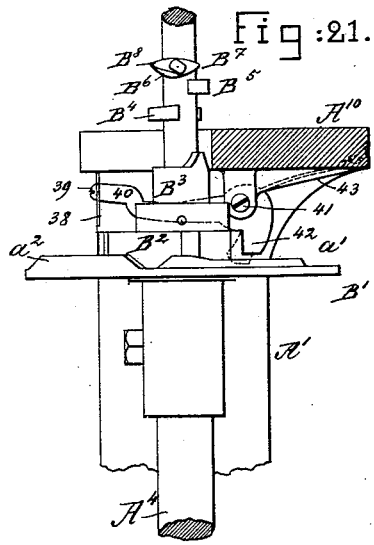
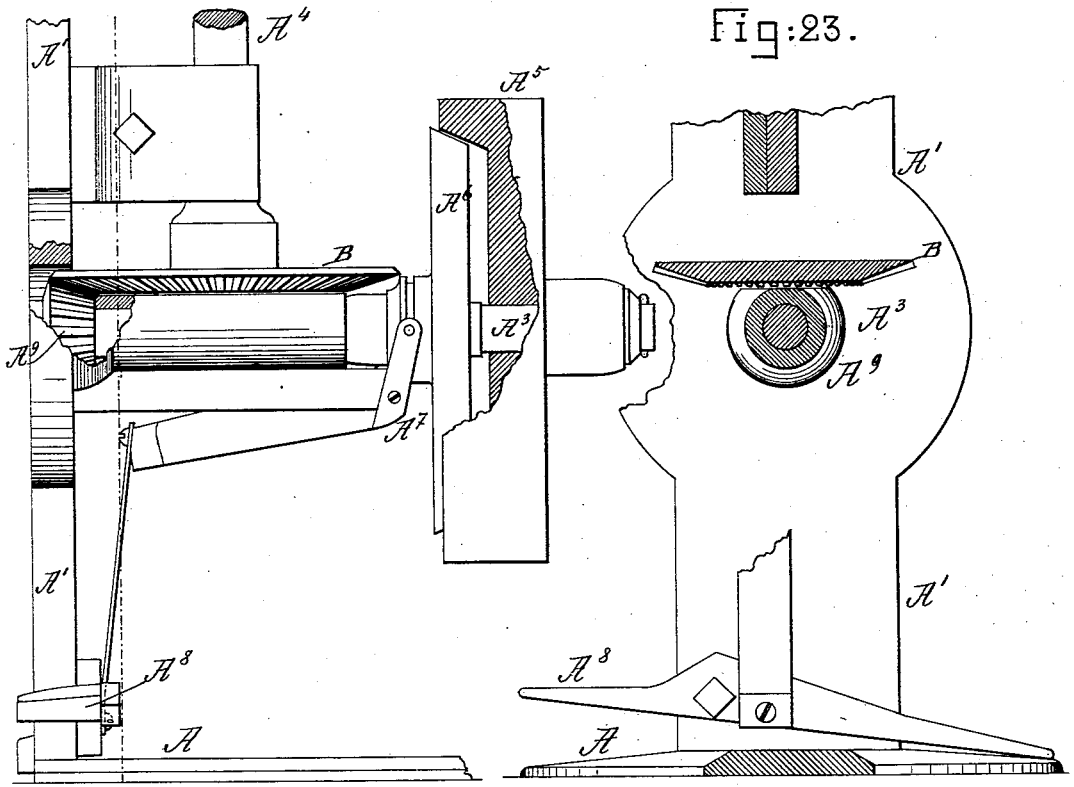

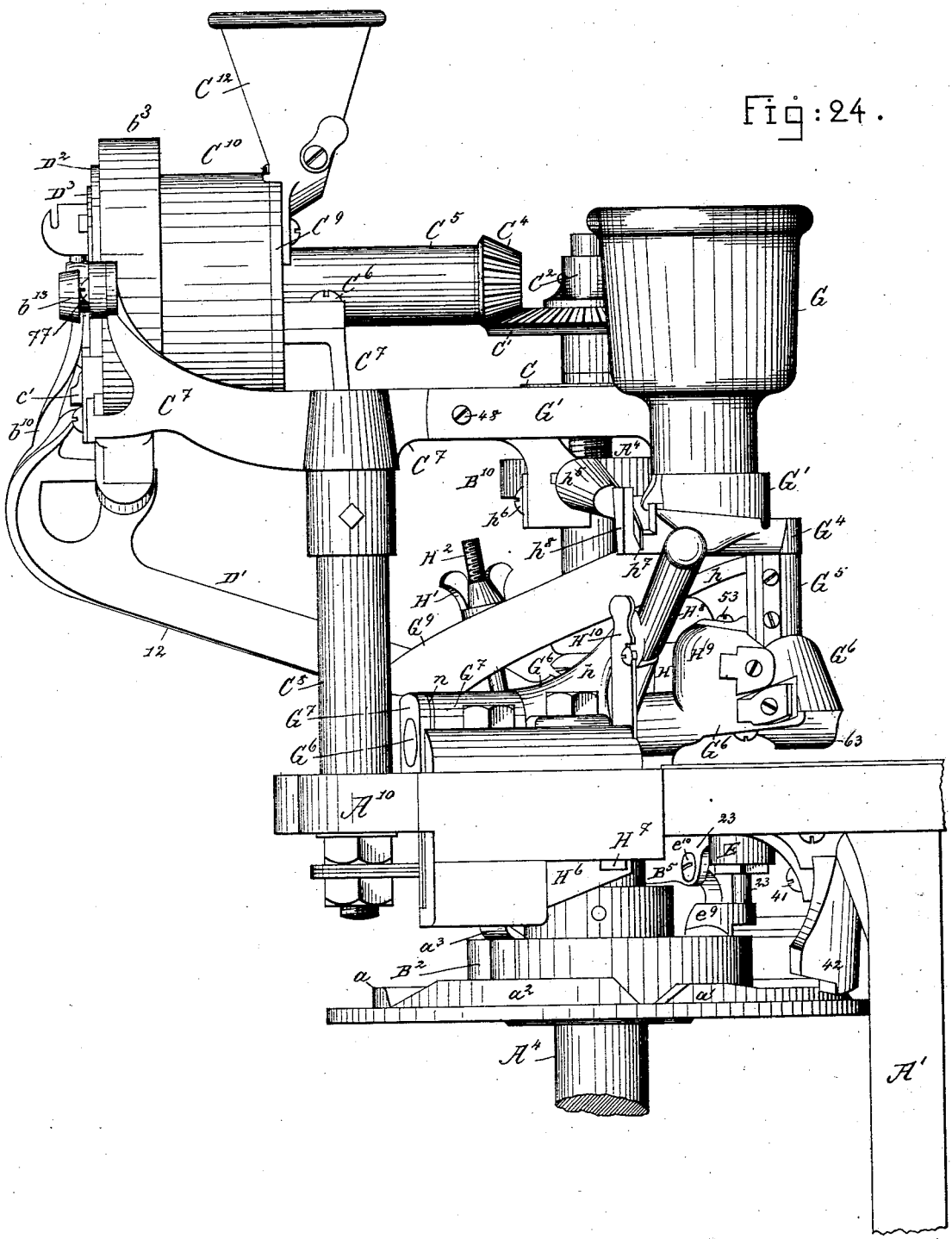
Fig: 24.

(No Model.) 9 Sheets—Sheet 8.

H. N. HEMINGWAY.
MACHINE FOR ATTACHING BUTTONS TO BOOTS, SHOES, OR OTHER ARTICLES.

No. 308,769. Patented Dec. 2, 1884.

Witnesses.
Arthur Lipperton.
A. O. Orne.

Inventor.
Henry N. Hemingway.
By Crosby & Gregory
Attys.

(No Model.)
9 Sheets—Sheet 9.
H. N. HEMINGWAY.
MACHINE FOR ATTACHING BUTTONS TO BOOTS, SHOES, OR OTHER ARTICLES.
No. 308,769.  Patented Dec. 2, 1884.
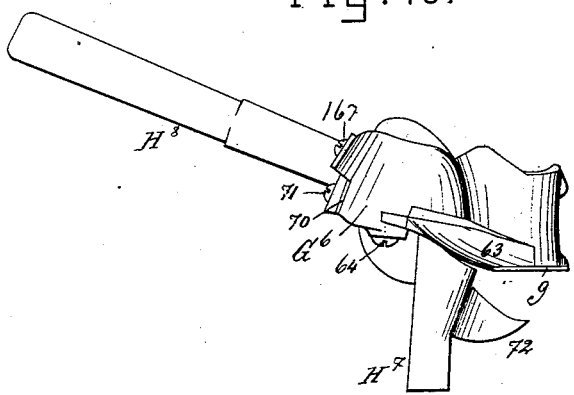
Fig: 46.
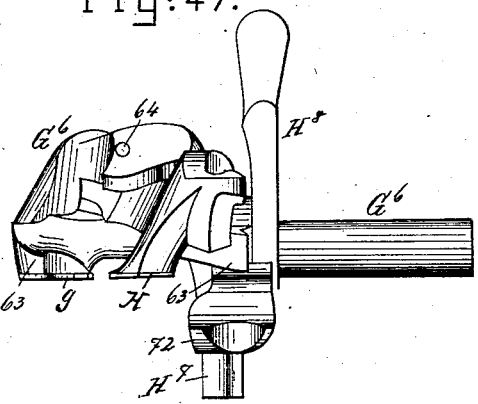
Fig: 47.
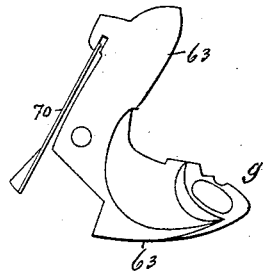
Fig: 48.
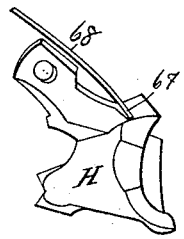
Fig: 49.
Witnesses.
Arthur Lippertin.
A. O. Orne
Inventor.
Henry N. Hemingway
by Crosby Gregory
Attys.

United States Patent Office.

HENRY N. HEMINGWAY, OF AUBURN, ASSIGNOR TO WILLIAM H. WOOD AND DEVALSON G. WEAVER, OF ROCHESTER, NEW YORK.

MACHINE FOR ATTACHING BUTTONS TO BOOTS, SHOES, OR OTHER ARTICLES.

SPECIFICATION forming part of Letters Patent No. 308,769, dated December 2, 1884, Application filed August 13, 1884. (No model.)

*To all whom it may concern:*

Be it known that I, HENRY N. HEMINGWAY, of Auburn, county of Cayuga, State of New York, have invented an Improvement in Machines for Attaching Buttons to Boots, Shoes, and other Articles, of which the following description, in connection with the accompanying drawings, is a specification, like letters on the drawings representing like parts.

This invention has for its object the production of an automatically-operating machine by which to attach buttons to boots, shoes, and other articles, the fastening employed being such as described in United States Patent No. 295,709, dated March 25, 1884.

In my improved machine the buttons are placed in a hopper, from which they drop into a slotted receiver, and thence into a button-guide, from which guide they are permitted to escape one by one upon a button-support, where they are held by a button-presser. The fasteners are placed in a hopper, from which they fall into a rotating fastener-receptacle having pins by which to keep the fastener agitated, and the fasteners, delivered singly from the fastener-receiver into a fastener-case, are acted upon by a brush having flexible arms, and are duly deposited in a slot in the case, and the said fasteners are pushed out upon a wing-piece or switch, and thence upon a fastener-directing bar provided at its under side with a race on which the fasteners are suspended, the said bar at its lower end having a let-off lever, which is actuated at the proper time to let off a fastener, in order that it may drop into the open jaws of the fastener-carrier. The button-holding foot, which holds the button on the button-support, is slotted to form a guide for the fastener, and while the button is held between the button-support and foot an awl is thrust up through the material and the eye of the button-shank, and is then withdrawn. In such condition the carriage supporting the fastener-carrier and containing a fastener between its jaws, with the point of the fastener directed upward to enter the awl-hole, is swung into position under the said awl-hole, the awl at the same time being moved away from below the button-support, and on the arrival of the fastener in position the carriage and fastener are lifted to force the point of the fastener up through the material and the eye of the button, and then the fastener-carrier is moved in a curved path to turn the hook part of the shank of the fastener through the material and eye of the button, and the fastener-carrier is then moved a little farther in the same direction, and thereafter the button-support and the shank-closer are brought together just above the material to close the shank below the wire constituting the eye of the button, the outturned point of the fastener being closed down against the material, and then the button-support and shank-closer, and the remaining parts of the machine above the bed-plate are lifted, through the movement of a rock-shaft, to release the material and permit it to be moved on the bed-plate, to again place the material in position to have another button set at the desired point.

The particular features in which my invention consists will be hereinafter described, and particularly pointed out in the claims.

Figure 1 is a top or plan view of a button-setting machine embodying my invention, the presser-foot and shank-closer being partially lifted; Fig. 2, a front elevation of the upper part of the said machine. Fig. 2$^a$ shows two different elevations and a bottom view of the button-presser foot; Fig. 3, a right-hand side elevation of Fig. 2. Fig. 4 is an inner side view of the stationary button-case detached; Fig. 5, a section of the same, looking down from the line $x'$ $x'$; Fig. 6, a rear side view of Fig. 2; Fig. 7, a sectional detail of the fastener-receptacle and its co-operating devices, to be described, together with the wing-piece or switch on which the fasteners, which are properly selected for use, are delivered; Fig. 7$^a$, a section on the line $x^2$, Fig. 7. Fig. 8 is a section of Fig. 7 in the dotted line $x^4$ $x^4$, the hopper being omitted; Fig. 9, a section of Fig. 7 on the dotted line $x^3$ $x^3$. Fig. 10 is a detail showing the brush removed. Fig. 11 is a detail showing part of the jarring mechanism, the throat of the button-controlling mechanism, and the slotted button-receiver. Fig. 12 is a detail in plan view of the button controlling and delivering devices, presser-foot, shank-closer, and rock-shaft to move them, the presser-foot and shank-closer being separated and supposed to be lifted from the bed-plate, (not shown,) as for the removal or insertion of work; Fig. 13, an elevation of Fig. 12, looking at it in the direction of the arrow, Fig. 12; Fig. 14, longitudinal and cross-sections of the button-guide; Figs. 15 to 19, inclusive, details of the frame-work, and the carriage containing and moving the fastener-carrier and awl and the jaw-opener; Fig. 20, a detail showing an end view of the main shaft and its attached cams; Fig. 21, a side elevation of the parts shown in Fig. 20, together with the lever which moves the fastener-carrier. Figs. 22 and 23 are details of the base of the machine, showing the driving parts; Fig. 24, a partial rear side elevation of the upper part of the machine. Fig. 25 is a detail of the fastener-carrier; Fig. 26, a right-hand end view of Fig. 25; Fig. 27, the jaw-moving cam; Figs. 28 to 30, inclusive, details of each of the jaws of the fastener-carrier; Figs. 31 and 32, details of the jarring mechanism, to illustrate the method of attaching the ratchet-toothed wheel to the main shaft and driving the said wheel. Figs. 33 to 35 represent portions of the fastener-directing bar and let-off lever or device, the nose of the said lever being somewhat removed from the race and out of normal position, to avoid confusion of lines; Figs. 36, 37, and 38, elevations of the fastener-carrier in different positions, the plate $d'$ being partially broken out; Fig. 39, a top view of Fig. 38, showing the jaws of the fastener-carrier open. Fig. 40 is a detail of the fastener carrier or jaws elevated against the jaw-opener to fully open the jaws. Figs. 41, 42, 43 show a part of the fastener-carrier with a fastener, merely to illustrate some of the different positions assumed by them when the fastener is being inserted. Fig. 44 shows one of the fasteners employed in this machine; Fig. 45, one of the buttons to be held by it. Figs. 46 and 47 are details of the rock-shaft $G^6$, the attached presser-foot, button-support, and shank-closing device. Fig. 48 shows the presser-foot and button-rest by itself. Fig. 49 represents the shank-closing device by itself.

Referring first to Fig. 44, it will be noticed that the fastener $f$ is composed of wire bent to form a point, $f'$, a hook, $f^2$, a shank, $f^3$, and a base, $f^4$.

Referring to Figs. 22 and 23, A represents the base or foot of the machine, and A' an upright or column having at top a table, $A^{10}$, and partially covering the table is a work-supporting plate, $A^2$. (See Figs. 1, 2, 3, and 6.) The upright A', broken out in the drawings to save room, is provided with suitable bearing-pieces for the power-shaft $A^3$ and the main cam-shaft $A^4$. The shaft $A^3$ has loose upon it the belt-pulley $A^5$, and next to it is the friction-plate $A^6$, splined on the said shaft, and made movable thereon toward and from the loose pulley by means of a lever, $A^7$, under the control of a lever, $A^8$, to thereby start or stop the machine at will. The shaft $A^3$ has fast on it a bevel-gear, $A^9$, which engages a larger bevel-gear, B, fast upon the lower end of the main cam-shaft $A^4$. The cam-shaft has attached to it a large disk, B', having upon its top cams, $a\ a'\ a^2$, the said shaft (see Figs. 20 and 21) also having fast on it a hub, $B^2$, having an attached dog, $a^3$, pivoted at 34, (see Figs. 3 and 6,) and supported by a spring, 36, (the said spring-dog acting indirectly to lift the awl $e^8$,) and a tooth, $a^4$, to engage a toe, 25, on the foot of a carriage, $e^3$, to be described. Above the hub $B^2$ the shaft $A^4$ has connected with it cam-surfaces $B^3$, $B^4$, $B^5$, $B^6$, $B^7$, and $B^8$, to be described. Above the cams referred to the shaft $A^4$ has fast upon it a collar, $B^9$, (see Figs. 31 and 32,) grooved at $a^5$, and having teeth $a^6$, against which engages a spring-actuated pawl, $a^7$, pivoted at $a^8$ on the ratchet-toothed wheel $B^{10}$, the said wheel at its interior being provided with an annular groove, $a^9$, for the reception of the said pawl. The ratchet-toothed wheel rotating on the collar $B^9$ is driven in unison with the shaft $A^4$ by the pawl $a^7$, acted upon by the teeth $a^6$. To reverse the ratchet-toothed wheel $B^{10}$ for any purpose, it may be turned into such position as to place the point of the pawl upon the crown of a tooth, and in such position the wheel $B^{10}$ may be lifted from the hub $B^9$. Above the wheel $B^{10}$ the shaft $A^4$ is provided with a screw-thread, as shown in Figs. 2 and 3, and upon such threaded part is placed an adjustable friction-nut, C, the hub of which may be screwed with greater or less force up against the hub of the bevel-gear C', placed loosely on the shaft $A^4$ below a fixed collar, $C^2$, the said bevel-gear C' being thus driven frictionally, as will be understood, chiefly to avoid breakage of parts, or to stop, when desired, the rotation of the shaft having upon one end of it the bevel-gear $C^4$. The shaft $C^3$ has its bearing in a sleeve, $C^5$, attached by screw $C^6$ to a tri-armed bracket, $C^7$, secured to a post, $C^8$, secured by a nut to the fixed table $A^{10}$. The sleeve $C^5$ has an attached disk, $C^9$, which forms one end or head of the rotating fastener-receptacle $C^{10}$, the said receptacle having leading into it a hopper, $C^{12}$, attached by screws $C^{13}$ to the said disk. The fastener-receptacle $C^{10}$ forms, preferably, an integral part of the shaft $C^3$, and the vertically-arranged dividing-wall $b$ of the said rotating receptacle has an opening, $b'$, through which, as the receptacle is rotated, the fasteners are delivered singly. The internal diameter of this receptacle is tapering, it growing larger toward the said partition, so that the fasteners have a tendency to work in that direction. The opening $b'$ in the partition $b$ is made at the end of an arc-shaped groove, $b^4$, (shown in dotted lines, see Figs. 3 and 8,) the groove being deepest at the opening $b'$, thus enabling the fastener to be stopped against the partition at the edge of the said opening when the fastener falls out of the said receptacle into the stationary fastener-case D, having ears (see Fig. 6) secured by screws 77 78 to a curved part of the tri-armed bracket $C^7$. The receptacle $C^{10}$ is provided at its inner side with a series of pins, $b^2$, which serve to agitate the fasteners and keep them separated. The outer end of the rotating receptacle $C^{10}$ is provided with a flange, $b^3$, within which the fastener-case D is extended, and in the space between the partition $b$ and the case D is placed a brush composed of a hub, $b^5$, and attached flexible arms $b^6$, made, preferably, of india-rubber packing. The brush rotates in unison with the receptacle $C^{10}$, and carries the fasteners $f$ about with it in the space referred to, some of the said fastenings from time to time entering a slot, $b^7$, at the lower side of the fastener-case, (see Figs. 3, 4, and 5,) the said slot passing outward through the wall of the case, the case at the outer end of the said slot being provided with rests or guides $b^8$ $b^9$, the rest $b^8$ having a downwardly-extended flange, 3, over and along which the hook of the fastener $f$, if properly placed or dropped in the slot $b^7$, is moved to insure the delivery of the fastener upon the inner end, 2, of the downwardly-curved wing or switch, $b^{10}$, having the form in cross-section substantially as shown in Fig. 7ª. The shank of the switch is pivoted at $b^{12}$ upon the fastener-case, and is provided with a counter-balance or weighted arm, $b^{13}$, which keeps the lower end, 8, of the switch against a shoulder, 9, of the bar D, the counter-balance so nearly balancing the switch that any pressure at the lower outer end of its curved race, as will be described, except that due from the fasteners directly upon it, will overcome the weight of the arm $b^{13}$ and turn the switch so that the upper end, 2, of its race will be thrown out of line with the flange 3 of the rest or guide $b^8$, and thereafter, until the proper balance is again established, the fasteners will be discharged from the slot $b^7$ and will fall into the pail $D^5$. (See Fig. 1.) This balancing of the switch $b^{10}$ is essential, and is made available whenever the fastening-directing bar D′ (shown well in Figs. 3 and 6 and 33 to 35) and the race of the switch have their full complement of fasteners, as thereafter pressure of the vanes $c$, to be described, against the fasteners in the slot $b^7$ is communicated to the fastenings on the race of the switch, thus tipping the switch out of line with relation to the flange 3. The inner wall of the flange of the case D at each side of the slot $b^7$ is reduced in thickness, making a recess larger than the slot, into which the fasteners are thrown by the brush. The hooked or shank part of a fastener having dropped into the slot $b^7$, the base thereof hangs upon the walls or edges of the rests or guides of the case D; and the fastener so lodged in the slot $b^7$, if the point $f'$ is directed toward the partition $b$, is acted upon by spirally-placed vanes $c$, three being herein shown, (see Figs. 6 and 8,) which are attached to the inner side of the flange $b^3$ of the rotating fastener-receptacle $C^{10}$, the said vanes acting against the shanks of the fasteners, which thus protrude below the flange of the case D, turning the said fasteners so that their points extend forward in the direction of rotation of the receptacle $C^{10}$, and then the vanes in their further movement with the receptacle $C^{10}$ force the fasteners laterally along the slot $b^7$, over the flange 3, and upon the point 2 of the race of the switch $b^{10}$. If the point of a fastener the shank of which is dropped into the slot $b^7$ falls in the opposite direction, one of a series of pins, 4, (see Fig. 7.) carried by the flange $b^3$ of the receptacle $C^{10}$, acts against the fastener near its point and turns the fastener quarter around, placing its point in the proper direction, and thereafter the vane $c$, next to strike the fastener $f$, moves it in the proper direction into the slot $b^7$ and toward the switch $b^{10}$. The case D has a guard, $c'$, attached to it by a screw, $c^2$, (see Fig. 4,) the said guard (shown in section, Fig. 6, and in full lines, Figs. 4 and 5) being located sufficiently above the edge of the case D at the slot $b^7$ to permit the base of a fastener to pass under the guard. In case that the base of a fastener drops into the slot $b^7$, and any part of its shank gets under the guard so that the brush cannot sweep the fastener out of the slot $b^7$ and carry the fastener around with it, the vane $c$, acting on the fastener so wrongly placed, will force the fastener along in the slot together with the properly placed and suspended fasteners, but after passing from under the guard the wrongly-placed fastener, with its shank yet within in stead of below the case, will be forced out of the slot $b^7$, but not upon the race of the switch $b^{10}$, for the point 2 of the switch is not at such time in line with the flange 3, but with the slot $b^7$, and the said wrongly-placed fastener will drop into the pail or receptacle to be reused.

To aid each fastener in falling correctly into the slot $b^7$, I have provided the case D with a projection, $c^3$, against which the outer edges of the flexible blades $b^6$ strike in the rotation of the brush, the said blades being thus tipped up at one side, which makes a tapering space and causes the fastener $f$ to fall backward against the partition $b$, with the shank directed downward and with the base uppermost, and the said blades are kept tipped while the fastener slides along the same toward their ends, the fasteners being thus presented, in the rotation of the blades, to the slot $b^7$, with their shanks and points directed toward the said slot. The ear $c^4$ of the case D has a part, 6, on which is placed a hub, 5, (see Figs. 7 and 1,) having a slot, 7, in which is hung the bail $D^6$ (see Fig. 1) of a pail or receptacle, $D^5$, in which drop the fasteners, which are passed from the slot $b^7$, and do not catch upon the race of the wing or switch $b^{10}$. This hub 5 forms part of a thin spring-plate, $D^3$, which has attached to it, by suitable screws, an india-rubber or other non-metallic plate or lid, $D^2$, which shuts or closes the outside of the case D. The lower end, 8, of the wing or switch $b^{10}$ is held by the counter-weight $b^{13}$ against a shoulder, 9, at the upper end of the fastener-directing bar D', it having along its lower side a flanged projection or race, 12, upon which slides and hangs the fasteners $f$, as shown in Figs. 33 and 35, the said fasteners sliding by gravity, assisted by a jarring movement, as will be described. The bar D' is supported by screw 91, inserted through it into the upright 92, attached to the table $A^{10}$ by screw 93 and a screw at its upper end. At its lower end the bar D' is provided with a let-off device, $D^7$, (shown as an elbow-lever,) pivoted at $D^8$, the long arm of the said lever having a head, $D^9$, the latter being acted upon by a spring, $D^{12}$, (see Fig. 33,) fastened to an ear, $D^{14}$, of the bar D' by a screw, $D^{13}$, the said spring normally acting to force the nose 13 of the let-off device toward the delivery end of the race 12 of the bar D', to prevent the escape of fasteners $f$ therefrom; but after the fastener-carrier, which receives between its jaws the base of a fastener and passes the point thereof through the material, has been brought into position below the lowermost fastener of the series of fasteners on the bar D', and the jaws of the said fastener-carrier are opened, the let-off is operated to remove its nose 13 from the end 12 of the bar D', thus forming an opening, through which the fastener $f$, next to be inserted, may drop into the open jaws of the fastener-carrier. This let-off is operated by the cam-surface $B^6$, before referred to, which strikes the said head $D^9$ and depresses the long arm of the lever, carrying it against the spring $D^{12}$, and at the same time the said spring is depressed sufficiently far to cause its free end to act as a detent for the series of fasteners on the race 12, the spring $D^{12}$ at such time coming directly against the fastener next back of the one to be let off and inserted in the material.

The fastener-carrier is composed of a pair of jaws composed, as herein shown, of three plates, $d\ d'\ d^2$, held side by side in a carriage, E, and operated therein chiefly by a cam, $d^3$, as will be described. The central plate, $d$, having a thick portion or enlargement, 27, provided with a shoulder, 18, constitutes one member of the jaw, while the two like plates $d'\ d^2$, with projections 16 at their outer sides, and shoulders 17 at their inner sides, constitute the second jaw. Fig. 28 shows the inner side of plate $d'$, and Fig. 30 the outer side of plate $d^2$. These plates $d'\ d^2$ have like slots 15, and each plate has a projection, 16, which is extended laterally and forward, the rear ends of the projections presenting shouldered portions 17, which constitute the effective parts of one-half of the jaw to grasp the fastener, the opposed acting surface being the inner face, 18, of the thickened portion 27 of the plate $d$.

The several plates $d\ d'\ d^2$ have each a central opening in which is located a broad, thin U-shaped spring, $d^4$, (shown in Fig. 25, and also in Figs. 36 to 38,) the said spring normally acting to keep the jaw portions referred to pressed toward each other, so as to grasp and hold a fastener placed between them. The central plate, $d$, is also provided with a slot, 19, but at an inclination differing from the slots 15 in the plates $d'\ d^2$. A horizontal pin, 20, held in the carriage E, is extended through the slots 15 and 19 of the plates $d'$, $d^2$, and $d$, a second pin, $d^{15}$, is extended through the holes $d^{16}\ d^{17}\ d^{18}\ d^{19}$, respectively, of the cam $d^3$, forming part of the shaft $d^5$, and the plates $d'\ d\ d^2$, the said shaft and cam in their partial rotation in the carriage swinging the said plates, the difference in the inclination of the said slots as the plates travel upon the said pin causing such movement of the plates as to effect the opening of the jaws against the spring $d^4$, the jaws being opened a little as the lower ends of the said slots approach the said pin—as, for instance, as in Fig. 37—but further upward movement of the plates, as in Fig. 38, further separate the said jaws.

In Figs. 37 and 38 a portion of the outer plate, $d^2$, has been broken out to show the grasping parts 17 18 of the jaws at different distances apart.

Figs. 41 to 43 show part of the jaw $d^2$ in the different positions assumed by it when inserting a fastener. The shaft $d^5$, carrying the cam $d^3$, is extended through the carriage E, and has fixed to it a toothed sector, $d^6$. (See Figs. 17 and 18.) The hub of the sector has connected with it one end of a spiral spring, 46, and the opposite end of the said spring is engaged with a pin, 47, so as normally to keep the sector in the position Fig. 17, and the cam $d^3$ as in Fig. 36. At the proper times the sector $d^6$ is moved in opposition to the spring 46 by a toothed sector, $d^7$, pivoted at 22 on a fixed part, 23, of the machine. The carriage E has a stem or pivot, $e$, extended through the sleeve $e'$ of the stationary part 23, and below the said sleeve the said stem has a foot, $e^3$, secured to it by a pin, $e^2$. The foot $e^3$ has an incline, 24, at bottom, a tooth, 25, a toe, 44, and an annular groove, 26. The foot $e^3$ is shown as having an upwardly-extended hub provided with an opening above the pin $e^2$, which is of larger diameter than the sleeve $e'$, so that the said hub, when the foot is lifted by the action upon it of the cams $a\ a'$ in succession, is enabled to pass up over the lower end of the sleeve $e'$ of the carriage E. The sleeve $e'$ is surrounded by a spiral spring, $e^5$, which at its upper end is connected with stationary part 23, and at its lower end with the slot 26 of the hub of the foot $e^3$, the normal tendency of the said spring being to keep the carriage pressed toward the jaw-opener $e^6$, and to also hold the carriage down on the said stationary part 23 of the frame-work. The jaw-opener $e^6$ is attached to the part 23 by screws $e^{10}$. The projections 16 of the plates $d'\ d^2$ extend beyond the wide portion 27 of the plate $d$, so that when the carriage is moved to force the outer ends of the said projections against the jaw-opener, as when the carriage is brought into position to receive a fastener, the said plates $d'$ $d^2$, constituting one part of the jaw, are arrested before the plate $d$ is arrested, and further movement of plate $d$ in the same direction compresses spring $d^4$, and consequently the shouldered part 18 of the moving plate $d$ is caused to pass away from the shouldered parts 17 of the arrested plates $d'$ $d^2$, thus partially opening the jaws to form a space in which the fastener may be dropped when the carriage is thereafter raised, such movement of the carriage by the cam $a$, while the projecting portions 16 are in contact with the jaw-opener $e^6$, beveled at its edge, causing the plates $d'$ $d^2$ to be pushed backward against the action of the spring $d^4$, thus further enlarging the opening between the shoulders 17 and 18 of the jaws, making such opening sufficient to easily receive the base of the fastener. The subsequent descent of the carriage and the movement of the same toward the button-support, as will be described, enables the spring $d^4$ to become fully effective and cause the fastener to be firmly held by the jaws. The carriage E is provided with an arm (see Fig. 16) chambered to receive an awl-carrying bar, 28, provided with an awl, $e^8$, connected therewith, as herein shown, by a nut, 29. This awl is held in the said chamber by a screw-cap, 30, and a spring, $e^7$, in the chamber normally acts to keep the awl retracted and the lower end of the awl-carrying bar depressed, to be lifted by the lever $e^9$, pivoted at $e^{10}$ on the stationary part 23 of the frame-work. The chamber for the reception of the awl is located about ninety degrees distant from the fastener-carrier. The carriage E is moved to carry the fastener-carrier from a position below the delivery end of the fastener-directing bar to a position just below the button-support by means of the tooth $a^4$, (see Fig. 20,) which engages the tooth 25 of the foot $e^3$. The foot $e^3$ has one side cut away, as shown at 30, Fig. 19, thus forming a concaved surface which, in engagement with the surface 31 of the cam $B^2$, acts to hold the carriage in position while being lifted by the cam $a'$ to cause the fastener-carrier jaws to force the straight part or point of the fastener up through the material and the eye of the button. The depression 32 of the cam $B^2$ (the points of the fastener having been inserted up to the junction of the point and hook of the fastener) permits the carriage E to be moved back a little by the spring $e^5$ at the same time that the plates $d$ $d'$ $d^2$, constituting the jaws, are lifted by the cam $d^3$ to thus wind the hook part $f^2$ of the shank of the fastener through the material, and thereafter, in the further movement of the cam $d^3$ and of the cam $B^2$, the surface 33 of the cam $B^2$ (the plates $d$ $d'$ $d^2$ or jaws being in their highest position) acts to again move the carriage E forward for a little distance, causing the fastener-carrier to project the straight part $f^3$ of the shank of the fastener up into the material, this latter movement of the carriage and carrier causing the plates, through the slots and pin 20, before described, to release the base of the fastener and leave the same resting upon the upper part of the portion 27 of the plate $d$, the jaws and carriage remaining in such position while the shank of the fastener is being closed below the shank of the button, as will be described.

In Fig. 36 the fastener-carrier is down, but partially opened, ready to be raised for the reception of a fastener, the carrier being fully opened when lifted, as in Fig. 40, against the jaw-opener $e^6$, also shown in dotted lines. Fig. 37 shows the position of the carrier and its cam $d^3$ after the point and hooked part of the shank next the point has been inserted through the material. Fig. 38 shows the parts in the position they will occupy after the shank of the fastener has been pushed through the material. The lever $e^9$, which lifts the awl $e^8$ to force it through the material and through the eye of the button while the latter is held on the button-support $g$, is acted upon by the spring-dog $a^3$, pivoted at 34 on the large disk B', the said dog being normally held up in the position shown in Fig. 6 by the spring 36, so that in the movement of the disk B' the said dog will act upon and lift the lever $e^9$, and in case it is desired to run the cam-disk B' backward the dog $a^3$ will yield and not operate the lever $e^9$. The sector $d^7$, pivoted at 22, is connected by screw 37 with a short link, 38, in turn joined by a screw, 39, (see Fig. 21,) with a lever, 40, pivoted at 41 on a fixed part of the frame, the arm of the said lever being acted upon by the cam $a^2$ of the disk B', a spring, 43, acting to keep the short arm of the said lever down upon the said cam. The sector $d^7$ is shown in Fig. 15 in its normal position, and it so stands while the carriage E is moved to bring the fastener-carrier under the button-support $g$, such movement of the carriage placing the sector $d^6$ fast on the shaft $d^5$, in position above the sector $d^7$, and when thereafter the cam $d^3$ is to be turned to actuate the fastener-carrier the cam $a^2$ acts to raise the lever 40, vibrate the sector $d^7$, and cause it to turn the sector $d^6$ and its shaft $d^5$. The movement of the sector $d^7$ to operate the cam $d^3$ does not commence until after the point of the fastener has been forced up through the material. In the rotation of the cam $B^2$ after the tooth $a^4$ strikes the tooth 25 of the foot $e^3$ the projection 44 turns into the recess 45 of the cam, and in the further rotation of the cam $B^2$ the projection 44 bears against the surface 31 and travels over its inclines. The buttons to be employed are placed in a hopper, G, supported by the spring-arm G', pivoted at 48 on the tri-armed bracket $C^7$. The hopper G, open at its lower end, is provided with a sliding pin, $G^2$, which may be made to close more or less the opening in the bottom of the hopper, sliding the pin out and in, also acting to prevent the buttons from clogging. The lower end of the hopper rests by gravity upon the throat $G^3$, having an opening, $G^{20}$, and attached by screw 49 to the upper end of the button-receiver G⁴, slotted, as shown, at 50, (see Fig. 11,) and having a button-passage, 51, which in shape is substantially the same as the cross-section of the button B*, having an eye, B'*, the slot 50 communicating with the passage 51, so that the shanks of the buttons extended into the slot 50 will pass along through the same and permit the button on its arrival at the lower end of the button-receiver to tip over and fall down through the passage 51 into the button-guide G⁵, upon the upper end of which the slotted button-receiver G⁴ is attached by the screw 52. The button-guide G⁵, made in two semicircular parts, united by screw 56, has at one side an ear which receives screw 53, by which the button-guide is attached to a part of the rocking shaft G⁶, held in the bearing G⁷. The button-guide G⁵ (shown in section by itself in Fig. 14) has a channel or trough, 54, for the reception of the side of the button-head, and a ridge, 55, on which the shank of the button rests and slides. The guide G⁵ is provided with a slot, 57, through which to observe and gain access to the buttons to right them, and an opening, 62, for the reception of the finger-like end of the button-releasing lever 60, pivoted at 59 between ears 58, rising from the guide G⁵. The lever 60 has at its under side, back of its fulcrum 59, a lug, which is normally acted upon by a spring, 61, connected at its upper end with the guide G⁵, the lower end of the said spring being bent or hooked downward, to enter the short slot 62 in the upper side of the guide G⁵. The spring 61 acts normally to keep the finger-like end of the button-releasing lever 60 within the guide, to arrest or check the endmost button therein. The rock-shaft G⁶, which carries the button-guide G⁵, has an enlarged outer end or head of peculiar shape, which will be best understood by viewing Figs. 46 to 49. The head of the rock-shaft G⁶ has pivoted to it by pivot 64 a presser-foot, 63, having attached to it the button-support $g$, the said presser-foot bearing upon the material of the boot or shoe resting on the work-supporting bed or plate A². The button-support $g$ is provided at its upper side with a concavity, as shown in Fig. 12, and at its edge with a slot, 65, for the passage of both the awl $e^8$ and the point of the fastener $f$. The head of the rock-shaft G⁶ has pivoted to it by the same pivot 64 the shank-closing device H, one arm of which is extended loosely into the space in the head of the rock-shaft, the said shank-closing device having a slot, 67, (see Figs. 12 and 49,) in which is entered the free end of a spring, 68, attached by a screw, 167, to the head of the rock-shaft G⁶. A spring, 70, attached to the said head by a screw, 71, acts upon the presser-foot 63, the said two springs normally acting to keep the notched edge of the combined button-support and presser-foot and the notched edge of the shank-closing device separated. The rock-shaft G⁶ has attached to it an arm, 72, which at each rotation of the shaft A⁴ is acted upon by the cam B³, which turns the said rock-shaft in the direction to raise the presser-foot from the material, and also turning upward away from the said material the button-guide G⁵ and the shank-closing device, such upward movement taking place after the button has been fully set, and the material is to be moved to place it in proper position to have another button attached.

The button presser-foot G⁸, (shown in detail, Fig. 2ª,) is composed of two semicircular parts, which are screwed to the presser-lever G⁹, pivoted to the table A¹⁰ by a screw or pin, G¹⁰. This button presser-foot is cut away to form a button-passage, 73, so that the button may pass from the end of the button-guide into the chamber between the two parts of the button presser-foot and upon the button-support $g$, the top of which is covered over by the said button presser-foot. The button presser-foot is also slotted at 74 to form two lips to bear upon the button-shank at each side of its eye and press the shank which projects beyond the notched edge of the support $g$ down upon the material in the path of the awl, and of the point of the fastener, when they are pushed, respectively, up through the material and eye of the button-shank. This slot 74 is sufficiently long to permit the point and shank of the fastener $f$ to turn in as the fastener appears above the button-shank, the said slot also serving as a guide for the said fastener. The button presser-lever G⁹ is normally held down by an adjustable nut, H', on the screw-threaded rod H², the head of which is acted upon by a spring, H³, attached by the nut H⁴ to the lower end of the rod or standard C⁸. (See Figs. 3 and 6.) The spring H³ normally acts to keep the button presser-foot pressed down, but when the rock-shaft G⁶ is turned to lift the presser-foot, as stated, the cam-surface B⁸ of the shaft A⁴ strikes the lever G⁹ about opposite the point 75, (see Fig. 3,) lifting the said lever and attached button presser-foot from the button-shank, thus releasing the same, the said button presser-foot being retained by its actuating-cam somewhat elevated above the button-support, to permit a button to come readily into position on the support and into the said button presser-foot. The bearing G⁷ has attached to it, by the bolt $h'$, a rigid arm, $h$, the forward end of which is extended into position across and near the button-releasing lever 60, (see Figs. 1, 2, 3,) so that as the rock-shaft G⁶ is turned to lower the presser-foot 63 upon the material the descent of the button-guide with the said presser-foot causes the said lever 60 to strike against the rigid arm $h$ above the pivot 59 of the said lever, which withdraws the bent or finger-like lower end from below the endmost button in the button-guide, and permits the said button to roll out into the button presser-foot and upon the button-support, and after the presser-foot reaches the material and is checked thereby the button presser-foot continuing its descent for a short distance, correctly positioning the button with relation to it and the button-support, so as to insure the presentation of the open eye of the button in proper position for the awl and fastener. As the lever 60 is operated to release a button, the spring-detent 61 has its free end forced into the button-guide $G^5$ sufficiently far to act upon the button next back of the one to be released, holding it and the buttons back of it until the rock-shaft $G^6$ and button-guide are again lifted, when the lever 60, being released from pressure against the arm $h$, is placed under the control of the detent-spring 61, the latter causing the lever 60 to be moved in the direction to place its bent finger in the button-guide so as to arrest the buttons, and as the spring-detent in its further movement withdraws its free end from the button-guide it permits the button held by it to descend against the finger of the lever 60.

To cause the buttons to descend or settle in the button-guide, and also cause the fasteners to descend along the race of the fastener-directing bar $D'$, it is desirable to provide the machine with what I call a "jarring motion," which I will now describe. The tri-armed bracket $C^7$ (see Fig. 11) has pivoted upon it at $h^4$ a block, $h^5$, which by screws $h^6$ has fastened to it a spring-lever, $h^7$, one end of which is placed in a slot made in an ear, $h^8$, extended from the slotted button-receiver $G^4$, the opposite end of the said lever resting against the periphery of the ratchet-toothed wheel $B^{10}$, connected with and rotated by the shaft $A^4$, as previously described. One end of the lever $h^7$ is kept pressed against the ratchet-toothed wheel $B^{10}$ by a spring, $h^9$, attached to the tri-armed bracket $C^7$ by a screw, $h^{10}$. In the rotation of the shaft $A^4$ and wheel $B^{10}$ the teeth of the latter are carried past or under the end of the spring-lever $h^7$, so that the latter is intermittingly lifted and permitted to snap from the crowns of the teeth of the wheel $B^{10}$, thus indirectly jarring both the button-guide and the bar $D'$. The presser-foot 63 is held down upon the material by means of a spring, $H^6$, (see Fig. 24,) connected with a depending lug or ear of the table $A^{10}$, the said spring acting at its free end against an arm, $H^7$, of the rock-shaft $G^6$. The rock-shaft $G^6$ has attached to it a hand-lever, $H^8$, provided with a stud or pin, $H^9$, which, when the rocker-shaft is lifted to raise the presser-foot 63 from the material, may be caught by a notch of a holding-plate, $H^{10}$, pivoted at $H^{12}$ on the bearing $G^7$, (see Fig. 2,) if it is desired to keep the presser-foot elevated. The normal position of the shank-closing device, when the presser 63 is held upon the material, is as shown in Fig. 12, and until after the fastener has been pushed up through the material and the eye of the button the said shank-closer is kept open by its spring 67 and elevated by the cam $B^4$, which latter acts against a long surface at the under side of the said shank-closer; but as soon as the fastener has been fully turned up into the material and the button-support has been slightly moved backward the cam $B^7$ strikes the shank-closer and moves it downward to force the point of the fastener against the material, and then the cam $B^5$ acts upon the shank-closer at its rear side and moves it forward toward the button-support and shank of the fastener, so that the notched acting edge of the shank-closer, resting against the fastener at the junction of its point and hook, while the edge of the button-support pushes against the shank of the fastener close to the material, pinches the shank together sufficiently to close it under the shank of the button. The bed-plate has two openings, $m$ $m'$, the one, $m$, being under the presser-foot and button-support, to permit the awl and fastener carrier or jaws to rise up through it, the other, $m'$, being made solely to permit the nose 80 of the carriage $E$, through which the awl works, to rise when the carriage is turned in such position as to place the fastener-carrier or jaws under the presser, and the carriage is lifted by the cam $a'$. This nose 80 is essential when the awl is to penetrate the material, as it avoids the formation of a burr when the awl is withdrawn from the material.

In operation the material is placed upon the bed-plate. The presser 63 is lowered upon it, and the descent of the presser or the rock-shaft $G^6$ carrying it causes a button to be released, as stated, which button falls upon the button-support, and by the time that the presser 63 comes fully down upon the material the button-presser, into which the button passed when discharged from the button-guide, is forced down upon the button, holding it firmly in place on the button-support, with its shank projecting beyond the said support and in line with the notch 65 at the edge thereof. The normal position of the carriage E is with the awl $e^8$ in line with the notch 65 of the button-support, and the button having been caught and being held in place, the cam $a$ acts upon the foot $e^3$ of the carriage and lifts the same until the nose 80 strikes the material through the slot $m$, and thereafter the spring-dog $a^3$ acts, as described, to effect the movement of the awl $e^8$ to penetrate the material. The awl, having been thrust up through the material, is quickly drawn back by the spring $e^7$. When the carriage was lifted by the cam $a$ to place the nose 80 against the material, the fastener-carrier was lifted from immediately below the endmost fastener, and the let-off was opened to permit the fastener to be dropped into the space below the jaws of the fastener-carrier. The fastener having been so dropped into the jaws, the carriage is permitted to descend and the fastener is firmly clamped between the jaws. Next, the tooth $B^4$ of the cam $B^2$ engages the tooth 25 of the foot of the carriage, as described, partially rotating the carriage until the fastener-carrier is brought with the point of the fastener directly under the hole made in the material by the awl, and then the carriage is again raised, but at this time by the cam $a'$, and the point of the fastener is thrust up through the awl-hole made in the material and through the eye of the button, the top of the fastener-carrier being thrust against the under side of the material. After this the shaft $d^5$ and cam $d^3$ are turned, as described, to wind and push the hook $f^2$ and shank $f^3$ of the fastener $f$ through the material into proper position and without bending the shank out of place. The raising of the jaws of the fastener-carrier by the cam $d^3$ would cause them to be pressed so hard against the material as to obstruct their subsequent movement. So to avoid this the cam $a'$ for a short distance from its front end is made of less height. (See Fig. 24.) The projection 44 of the foot $e^3$ is held against the periphery of the cam $B^2$ by the spring $e^5$, and as the cam portion 33 passes beyond the said projection 44 the foot $e^3$ is gradually permitted to turn as the radius of the cam $B^2$ decreases; and, finally, the radius of the said cam is sufficiently short to permit the escape of the projection 44 of the foot when the spring $e^5$ acts and throws the carriage into its normal position. Longitudinal movement of the rock-shaft $G^6$ is prevented by a key, $n$, (see Fig. 12,) which enters a slot, $n'$, made in the said shaft at right angles to its length.

I claim—

1. In a machine for setting buttons, the rotating fastener-receptacle $C^{10}$, having the vertically-disposed dividing wall or head provided with the opening $b'$ for the discharge of the fastener, and having agitating-pins, to operate substantially as described.

2. The rotating fastener-receptacle and the case D, in which the fasteners are discharged from the receptacle, combined with the brush having flexible arms, the brush moving the fasteners about in the case, substantially as described.

3. The rotating fastener-receptacle and case D, provided with a projection, combined with the brush having flexible blades, the said projection operating to tip the blades and throw the fasteners toward the wall or head of the receiver, with the shank of the fastener directed downward, substantially as described.

4. The case D, provided with the discharge-slot $b^7$, and rests or guides $b^8$ $b^9$, the rest $b^8$ having a flange, 3, to operate substantially as described.

5. The slotted case D, its rest or guide $b^9$, and rest or guide $b^8$, provided with the flange 3, combined with the rotating flange $b^3$ and its attached inclined vanes, the vanes acting upon the shanks of the fasteners and forcing them outward through the slot of the case D, substantially as described.

6. The slotted case D, combined with the rotating flange $b^3$, provided with a pin to strike the shank of the fastener suspended in the slot of the case and turn the same about, substantially as described.

7. The slotted case D, provided with the extended rests or guides $b^8$ $b^9$, and having a gage, $c'$, to keep the fasteners down on the slot of the said case, substantially as described.

8. The slotted case provided with the rest or gage $b^8$, having a flange, 3, combined with the pivoted wing or switch having a race for the guidance of a fastener, substantially as described.

9. The case, its rest and guide $b^8$, provided with the flange 3, and the wing or switch, combined with the fastener-directing bar to receive the fastener from the switch, substantially as described.

10. The fastener-directing bar D', provided at its under side with the race 12, substantially as described, which is embraced by and serves to sustain the fasteners, to operate as and for the purpose set forth.

11. The fastener-directing bar provided at its under side with the race 12, on which the fasteners are suspended, combined with a let-off device to release the fasteners, substantially as described.

12. The fastener-directing bar provided at its under side with the race 12, on which the fasteners are suspended, and the let-off device, combined with the detent-spring to hold the fastener next back of the one permitted to escape by lifting the let-off device, substantially as described.

13. The fastener-directing bar provided with a race for the fastener, and a let-off device, combined with the fastener-carrier, the carriage E, and means, substantially as described, to lift the carriage and open its jaws to receive the fastener as it is dropped from the fastener-directing bar, substantially as set forth.

14. The hopper to receive the buttons and the throat, combined with the button-guide $G^5$, and with the button-receiver $G^4$, located below the throat, the said button-receiver having a slot, 50, and a button-passage, 51, substantially as described.

15. The slotted button-receptacle combined with the button-guide, and with the lever 60, to detain the endmost button and release it at the proper time, substantially as described.

16. The button-receptacle and button-guide combined with the button-holding lever 60 and detaining-spring 61, to operate the said lever and to hold the button next to the endmost button as the lever is moved to permit the escape of the endmost button, substantially as described.

17. The rock-shaft $G^6$ and attached button-guide, and the lever 60, combined with the arm $h$, to operate the said lever, substantially as described.

18. The rock-shaft $G^6$ and button-guide, combined with the presser-foot pivoted thereon, and provided with the button-support $g$, substantially as described.

19. The rock-shaft $G^6$, the button-guide, and the presser-foot provided with the button-rest, combined with the button-presser foot provided with a chamber to receive the button, and with projections to rest upon the shank of and hold the button in place, substantially as described.

20. The bed-plate, the rock-shaft $G^6$, and the pivoted presser-foot and button-support, combined with the shank-closer to co-operate with the button-support to close the shank of the fastener below the shank of the button, substantially as described.

21. The rock-shaft $G^6$ and the presser-foot and shank-closer pivoted thereon, combined with the springs to keep the same separated, substantially as described.

22. The rock-shaft $G^6$ and the shank-closer, combined with cams to operate the same, substantially as described.

23. The button-support, combined with the button presser-foot provided with an opening at one side of the passage into it of the button, and slotted to provide prongs to act upon and hold the shank of the button in place, substantially as described.

24. The presser-foot and its attached button-support, provided at top with a recess for the head of the button, and notched at its side in line with the eye of the button-shank, and the button-holding foot, all combined to operate substantially as described.

25. The carriage E, combined with the jaws and cam to operate the same, substantially as described.

26. The carriage, the jaws, the cam $d^3$, shaft $d^5$, and its attached sector $d^6$, combined with the sector $d^7$, and means, substantially as described, to actuate it.

27. The fastener-carrier, the carriage E, provided with the foot, and the spring $e^5$, combined with cams, substantially as described, to lift and partially turn the carriage.

28. The fastener-directing bar and the button guide and support, and the movable carriage containing a fastener-carrier, substantially as described, combined with means, substantially as described, to operate the said carriage and fastener-carrier, for the purposes set forth.

29. The fastener-directing bar and the button guide and support, and a movable carriage containing a fastener-carrier, and an awl, combined with means, substantially as described, to operate the said carriage, and the awl and fastener-carrier, for the purpose set forth.

30. The carriage, its pin 20, and the jaws composed of the slotted shouldered plates $d\ d'\ d^2$, and spring $d^4$, combined with the cam $d^3$, and means, substantially as described, to operate it, as set forth.

31. The carriage, the fastener-carrier, and the jaw-opener $e^6$, combined with means, substantially as described, to lift the carriage and place the projections 16 of the fastener-carrier in contact with the said jaw-opener, substantially as set forth.

32. The carriage, the awl-bar, awl $e^8$, and the lever $e^9$, combined with the pivoted dog $a^3$, to operate substantially as described.

33. The fastener-receptacle, the case D, into which the fasteners are dropped from the said receptacle, and the guide or rest $b^3$, provided with a flange, and the fastener-directing bar, combined with a movable or yielding switch interposed between the guide or rest, and the upper end of the fastener-directing bar, whereby the accumulation of fasteners on the said bar overcomes the normal position of the said switch and temporarily suspends the feeding of other fasteners upon the upper end of the said bar, substantially as described.

In testimony whereof I have signed my name to this specification in the presence of two subscribing witnesses.

HENRY N. HEMINGWAY.

Witnesses:
   G. W. GREGORY,
   B. J. NOYES.